United States Patent [19]

Graf

[11] 4,153,923

[45] May 8, 1979

[54] GROUND MONITORING SYSTEM AND METHOD

[76] Inventor: Robert G. Graf, P.O. Box 1628, Bluefield, W. Va. 24701

[21] Appl. No.: 768,743

[22] Filed: Feb. 15, 1977

[51] Int. Cl.² .............................................. H02H 5/10
[52] U.S. Cl. ........................................ 361/48; 324/51; 340/649; 340/652
[58] Field of Search ...................... 361/47, 48, 49, 50, 361/113, 108, 182, 184, 185; 324/51; 340/256, 310; 307/218, 219, 204

[56] References Cited

U.S. PATENT DOCUMENTS

| | | | |
|---|---|---|---|
| 3,335,324 | 8/1967 | Buckeridge | 361/48 |
| 3,387,064 | 6/1968 | Joy et al. | 340/256 X |
| 3,524,073 | 8/1970 | Tobin | 307/204 X |
| 3,633,199 | 1/1972 | Curry | 340/256 X |
| 3,703,717 | 11/1972 | Kuster | 361/182 X |
| 3,728,582 | 4/1973 | Agnew | 361/48 |
| 3,818,241 | 6/1974 | Ishizaka et al. | 361/182 X |
| 3,895,264 | 7/1975 | Kirilloff | 361/48 |
| 3,909,618 | 9/1975 | Fujii et al. | 340/310 X |
| 4,011,486 | 3/1977 | Oulton | 361/182 |
| 4,016,429 | 4/1977 | Vercellotti et al. | 340/310 X |
| 4,057,793 | 11/1977 | Johnson et al. | 340/310 |
| 4,066,912 | 1/1978 | Wetherell | 340/310 |
| 4,075,675 | 2/1978 | Burkett et al. | 361/48 |

Primary Examiner—Patrick R. Salce
Attorney, Agent, or Firm—William E. Mouzavires

[57] ABSTRACT

A system for monitoring the continuity of at least the ground wire of a cable connected between a mining machine and a power center. At the power center, a monitor signal is coupled to multi-phase power conductors of the cable through a multi-phase filter. The monitor signal from the conductors is coupled to the ground wire at the mining machine through another multi-phase filter. The signal returns through the ground wire to the power center where a current transformer couples the signal from the ground wire to a receiver. The receiver which receives and senses the characteristics of the returned signal includes parallel phase locked loop discriminators to prevent false tripping of the main power breaker if the monitor frequency should vary only slightly. The parallel discriminators provide a fail safe arrangement to prevent the main power breaker from remaining closed if one of the parallel discriminators should malfunction. A decrease in amplitude or change in frequency beyond a pre-selected range of the monitor signal at the receiver discontinues the receiver output so the main power breaker will open and cut off the A-C power to the mining machine.

2 Claims, 5 Drawing Figures

GROUND MONITORING SYSTEM AND METHOD

BACKGROUND OF THE INVENTION

In the mining industry, high voltage, usually multi-phase A-C power is supplied to mobile mining machines through multi-conductor cables which trail each machine. With mobile equipment, such as a mining machine, it is not practical to provide a ground at each location where the equipment operates. Therefore, each trailing cable usually includes, in addition to the current carrying conductors, at least one ground conductor connected to the frame of the mobile machine. The ground conductor connects the frame of the mobile machine positively to a ground at or near the power center which supplies the power to the machine.

To prevent hazards from shock at the mobile machines, the integrity of the ground must be maintained. Because of the environment in which the mobile machines operate, the ground wire is subject to damage and to faulty connection at the machine. If one of the current carrying conductors is shorted to the mining machine frame after the ground conductor breaks or its connection becomes faulty, a dangerously high voltage exists at the machine frame, and could harm mine personnel. For this reason, a continuous, reliable ground continuity monitoring system must be provided for each mobile machine.

Various devices to monitor the condition of the ground conductor connecting the mining machine to ground have been devised. Some monitoring systems include an extra conductor or pilot wire in the cable. A signal is provided to the remote machinery over the extra conductor and a different signal is transmitted back from the remote machinery through the ground conductor. Receipt of the different signal indicates continuity of the pilot wire and ground conductor circuit. Systems using an extra conductor are exemplified by the monitoring circuits of U.S. Pat. No. 3,335,324 — Buckeridge, issued on Aug. 8, 1967 and of U.S. Pat. No. 3,496,416 — Agnew, issued on Feb. 17, 1970. Buckeridge uses both ground and check conductors between the circuit breaker switch and a mining machine. Direct current in the monitoring circuit generated by a diode at the mining machine from the A-C power supply current provides operating current for the circuit breaker switch. A fault in the ground wire or check wire releases the switch terminating power to the remote unit. In the Agnew system, U.S. Pat. No. 3,496,416, a signal is sent over a pair of monitoring conductors in the cable to the mining vehicle. If there is continuity in the monitoring conductors, a signal transmitter is energized at the vehicle which transmits a signal to the source of power over the same conductors. Requiring the use of additional conductors or pilot wires, increases the expense of the system and may cause false operation of the monitoring system and unnecessary shut down of the equipment if the pilot wire should break while the ground wire remains intact. Also, the Agnew system requires a separate transmitter on each mining vehicle.

Examples of monitoring systems which do not use an extra conductor other than the ground wire include the apparatus of U.S. Pat. No. 3,728,582 of Thomas I. Agnew, issued on Apr. 17, 1973; U.S. Pat. No. 3,729,653 of Lawrence L. Manoff issued on Apr. 24, 1973, and U.S. Pat. No. 3,895,264 of Victor V. Kirilloff issued on July 15, 1975.

In the system of U.S. Pat. No. 3,728,582, the main source of power is disconnected from the cable when the apparent resistance of a conductor and the ground conductor exceeds a given value. Sensing the reflected impedance between the ground conductor and another conductor of the cable requires a transmitter circuit for each trailing cable in a multi-cable system. Each monitoring circuit must be isolated from other monitoring circuits operating in the system from the same power source.

In the system in U.S. Pat. No. 3,729,653, a D-C signal is impressed on the ground conductor by a transmitter on the mobile machine. When the current in the ground wire falls below a predetermined level, a relay is de-energized disconnecting the power from the mobile machine. In this system, a transmitter must be provided for each mobile machine. A diode bridge is required between the ground wire and the system ground. Access to the transmitter is limited because of its location upon the mobile machine rather than near the system power source.

The monitoring apparatus of U.S. Pat. No. 3,895,264 utilizes a star arrangement of impedances connected at the power source and at the mobile machine to provide a monitoring voltage which circulates current through the ground conductor and a monitoring impedance. One disadvantage of this system is that an impedance such as a solid state breakdown device must be inserted in the ground wire before it is grounded.

OBJECTS AND SUMMARY OF INVENTION

It is therefore an object of the present invention to provide a highly reliable ground continuity monitoring system which is sensitive to both power conductor and ground conductor faults without being susceptible to false triggering, which requires no pilot wire, which requires only a single transmitter to provide the monitor signal to a multiplicity of machines, and which requires no interruption of the ground wire with circuit components between the mining machine and the system ground.

Another object of the invention is a monitor signal sensing receiver which is sensitive to both the amplitude and frequency of the monitor signal and which includes an automatic frequency tracking feature so that the monitored signal received over the ground wire can vary over a predetermined range of frequencies without tripping the main power breaker.

Another object of the invention is the aforementioned monitor signal sensing receiver which includes redundant frequency tracking circuitry to increase the reliability of the monitoring system.

Another object is the aforementioned receiver which includes a time delay to prevent nuisance tripping caused by intermittent conditions.

Another object of the inventon is a continuity monitoring system including three-phase filters for coupling the monitor signal to the power conductors at the power center and for coupling the monitor signal to the ground wire at the mining machine; the filters also functioning to remove noise from the monitoring system and to present a balanced impedance to the power conductors.

Another object of the invention is a monitoring system which is easily and completely calibrated at the power source and which is adapted for easily adding or removing machines without requiring recalibration.

Another object is the aforementioned monitoring system with a monitor signal transmitter designed to drive a load that varies over a wide range of impedances.

Another object is a D-C power supply immune to large variations in line voltage to supply a constant D-C voltage to the aforementioned transmitter and receiver.

Another object is the aforementioned monitoring system which is inexpensively and reliably constructed using solid state circuitry.

To fulfill these objects, and in accordance with the invention, a low frequency A-C signal is generated in a transmitter at the power center and is coupled through a three-phase inductor-capacitor filter to each conductor of a three-phase A-C power line in the trailing cable connecting the power center to the mobile machine. The A-C monitor signal travels along the three-phase A-C power lines to the equipment being monitored. A second three-phase filter at the equipment couples the signal to the ground conductor of the trailing cable. The signal returns to the power center over the ground conductor. A current transformer installed around the ground conductor before it is frame grounded at the power source couples the signal from the conductor to a receiver. The receiver, which includes parallel redundant phase locked loop discriminators, is sensitive to the amplitude and frequency of the received signal. As long as the monitor signal is present in proper amplitude and frequency, the receiver maintains a main power breaker closed, so that power is supplied to the monitored equipment from the A-C power supply.

One transmitter is all that is necessary at the power center to provide the monitor signal for all cables of a plurality of mobile machines. However, a separate receiver is required for each machine. In the multiple system, the transmitter couples the monitor signal to the power conductors of each trailing cable through a three-phase filter associated with each cable. The receiver containing the discriminators locks onto a received signal of proper amplitude and frequency to provide an output to hold the main power breaker closed and supply A-C power to the mining machine. The discriminators track the monitor frequency over a predetermined frequency range to prevent false tripping of the main breaker if the transmitter should drift slightly. If one discriminator of a receiver fails, the other discriminator will prevent the main power breaker from remaining closed, should a cable fault occur.

BRIEF DESCRIPTION OF THE DRAWINGS

FIG. 3 is a circuit diagram of a three-phase filter of the system of FIG. 1;

DETAILED DESCRIPTION OF THE PREFERRED EMBODIMENT

Figure 1:
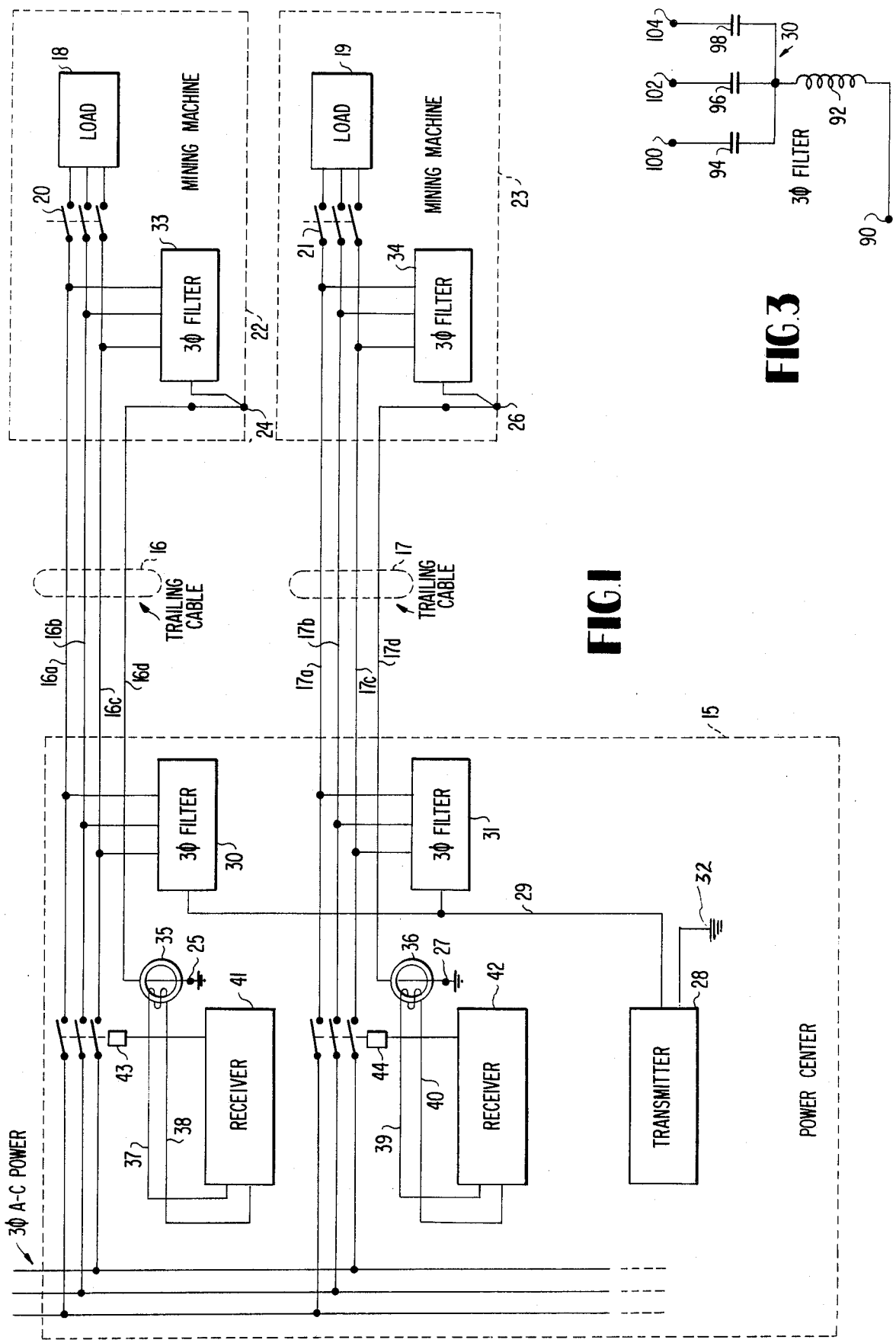
FIG. 1 is a block-circuit diagram showing a ground monitor system according to this invention.

Referring to FIG. 1, a power center 15 supplies three-phase, A-C power over conductors 16a, 16b, 16c and 17a, 17b and 17c of trailing cables 16 and 17 respectively. Conductors 16a, 16b and 16c and 17a, 17b and 17c are connected to the electrical loads 18 and 19 through switches 20 and 21 on mining machines 22 and 23 respectively. The trailing cables also include ground wires 16d and 17d to positively connect each mining machine frame to ground at the power center 15. Ground wire 16d is electrically connected to the frame of the mining machine 22 at frame ground 24. The opposite end of ground wire 16d is electrically grounded at ground 25 of power center 15. Similarly, ground wire 17a is connected at grounds 26 and 27.

For safe mining machine operation, the integrity of the ground wire of each trailing cable must be maintained to positively connect the mining machine frame to ground, and the integrity of the power conductors must be maintained to avoid additional hazards. To continuously monitor the system, a transmitter 28 provides a monitor signal at a frequency above the A-C power line frequency. The monitor signal is coupled via line 29 to three-phase filter 30 and to conductors 16a, 16b and 16c of the trailing cable 16. The monitor signal travels over the conductors to the mining machine 22 where three-phase filter 33 couples the signal from the conductors to the frame of the machine and to ground wire 16d. The monitor signal travels back to the power center 15 over the ground wire 16d to the ground 25. Before being grounded at the power center 15, ground wire 16d passes through current transformer 35 which picks up the monitor signal from the ground wire. The second output lead from the transmitter is frame grounded to the power center 15 at point 32 to complete the monitor signal path. Current transformer 35 couples the monitor signal to receiver 41 over lines 37, 38. Upon receipt of a signal of proper amplitude and frequency, the receiver 41 provides an output to the main power breaker 43 to close the breaker contacts and supply A-C power over the conductors 16a, 16b and 16c to the mining machine 22. Should the signal received at the receiver 41 fall below a given amplitude or deviate in frequency beyond a predetermined range of frequencies, the main breaker switch 43 will open, shutting off power to mining machine 22.

As is apparent from FIG. 1, the monitor signal from transmitter 28 is also transmitted to three-phase filter 31 which coupled the signal to power conductors 17a, 17b and 17c of cable 17. The three-phase filter 34 at the machine couples the monitor signal to machine frame ground 26 so that the monitor signal returns along ground conductor 17d and is coupled to the receiver 42 by lines 39 and 40 connected to transformer 36. The operation of the monitor system for mining machine 23 is identical to that explained for mining machine 22, in that circuit breaker 44 is closed by the output signal from receiver 42 and remains closed so long as a signal of the proper amplitude and frequency is received by receiver 42.

While FIG. 1 shows the system monitoring two machines, a substantial number of additional machines can be monitored. Each additional mining machine will of course have a trailing cable, and a monitoring receiver such as receiver 42. However, only one transmitter 28 is required to provide the monitor signal for as many as 20 or 30 additional machines.

Figure 2:
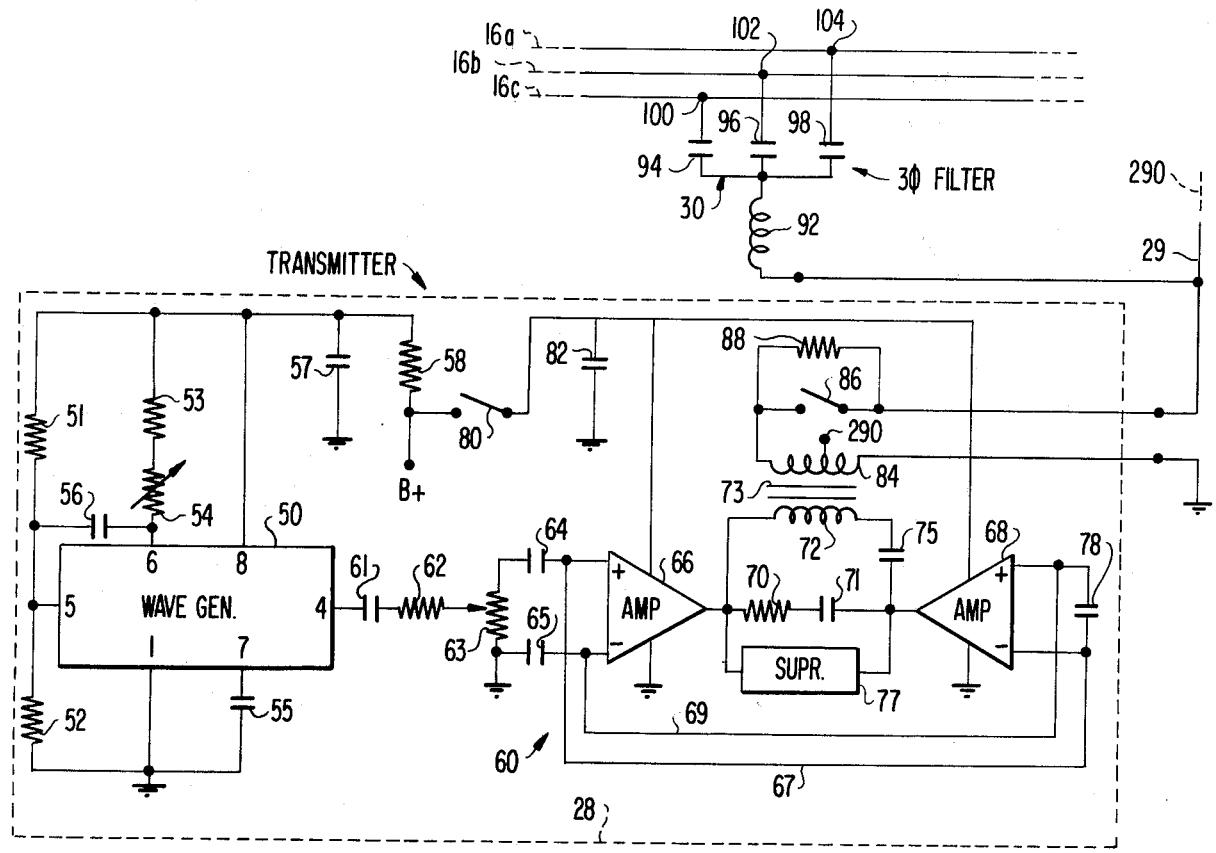
FIG. 2 is a circuit diagram of a monitor signal transmitter of the system of FIG. 1.

Transmitter 28 is shown at FIG. 2. Wave generator 50, which can be an LM 566 CN integrated circuit wave generator available from National Semiconductor Co., provides a triangular wave form when the circuit is connected as shown. Resistors 51, 52 and 53, variable resistor 54 and capacitors 55 and 56 are chosen to provide a signal of approximately 4.1 kilohertz, at output terminal 4 of the wave generator. The frequency can be varied somewhat by adjusting resistor 54. As will be explained later, precise frequency adjustment is not necessary because of the automatic frequency tracking features of the receivers 41 and 42. Capacitor 57 and resistor 58 filter the D-C B+ supply voltage for the wave generator 50.

The 4.1 kilohertz triangular wave is coupled from the wave generator 50 to a bridge amplifier circuit 60 through coupling capacitor 61 and input resistor 62.

A variable resistor 63 is connected across capacitors 64 and 65 which are connected to the respective plus and minus inputs of amplifier 66. The plus input terminal of amplifier 66 is connected to the minus input terminal of operational amplifier 68 by conductor 67, and the minus input of amplifier 66 is connected to the plus input of amplifier 68 by line 69.

Connected between the output of amplifiers 66 and 68 is a high pass smoothing filter including resistor 70 and capacitor 71. Primary winding 72 of a 4.1 KHz frequency selective transformer 73 is also connected between the amplifier outputs through the D-C blocking capacitor 75. A surge suppressor 77 is connected between the outputs of amplifiers 66 and 68.

Transformer 73 includes a secondary center tapped winding 84, one side of which is connected to electrical ground, and the other side of which is connected to line 29 via a resistor 88 and a normally closed switch 86 in shunt with the resistor. The line 29 is connected to three phase filter 30.

Variable resistor 63 controls the level of the signal applied through the capacitor 64 to the plus input of amplifiers 66 and the minus input of amplifier 68. These amplifiers, connected as bridge amplifiers, produce twice the normal voltage swing across the output load for a given supply voltage. The capacitor 65 provides an A-C ground for the minus input of amplifier 66 and the plus input of amplifier 68. Capacitor 78 functions to stabilize the amplifier bridge circuit. Suppressor 77 limits the output voltage through primary winding 72 of the transformer from the amplifiers and also protects the amplifiers from an over voltage through the secondary winding 84 of the transformer in the event that high voltage is connected to line 29.

Each amplifier 66 and 68 can be an integrated circuit amplifier LM 380N available from National Semiconductor Company. The amplifier bridge becomes operative when switch 80 is closed to connect the amplifiers to the B+ power supply. A filter capacitor 82 filters the supply voltage to the amplifiers.

The output level of secondary 84 of transformer 73 is approximately four volts peak-to-peak.

The power output of bridge amplifier 60 is sufficient to drive a load of from 100 ohms to 0.5 ohm with very little change in output voltage. The wide output impedance variation capability of the amplifier bridge 60 permits use of a single transmitter 28 to provide a monitor signal for numerous machines, all of which are monitored from the power center 15. A three-phase filter is simply connected to line 29 and to the conductors of the trailing cable of any additional mining machine which is to be monitored.

The amplified and smoothed 4.1 kilohertz monitor signal is coupled through secondary 84 of transformer 73 onto line 29 by a normally closed test switch 86, the operation of which will be discussed later.

The three-phase filter of FIG. 3, is an inductor-capacitor type filter tuned to present a high impedance to the A-C power signal while providing a low impedance to the monitor signal. Inductor 92 and capacitor 94, 96 and 98 form series resonant circuits at the monitor signal frequency presenting a low impedance to the monitor signal between line 29 and the points of connection 100, 102 and 104 of the respective capacitors to the power conductors 16a, 16b and 16c. Identical three-phase filters are used throughout the system, both at the power center 15 and on the mining machines such as machines 22 and 23. Although not shown, the filter shown in FIG. 3 may be modified to add two additional inductors 92 respectively connected to capacitors 94 and 98 with the inductors connected in parallel to each other and with a common connection to line 90. With this modification should a high resistance appear in one phase line because of the particular machine being monitored, sufficient signal will still be transmitted through the other two phase lines to allow continued monitoring and avoidance of a nuisance trip of the circuit.

Because the filters 30 are tuned, noise is eliminated from the monitor circuit. Each leg from line 90 to connections 100, 102 and 104, is identical and thus presents a balanced impedance to the conductors 16a, 16b and 16c of the trailing cable 16, thus eliminating the possiblity of phase currents in the conductors 16a, 16b and 16c becoming unbalanced due to coupling filter leakage.

The monitor signal coupled to the conductors 16a, 16b and 16c travels to mining machine 22. Another three-phase filter 33, identical to filter 30, previously discussed, couples the monitor signal to the mining machine frame ground 24. Filter 33 is tuned to the monitor signal frequency, filtering noise from the monitor signal and presenting a high impedance between the frame ground 24 of mining machine 22 and the power conductors at the A-C power signal frequency. The monitor signal returns from the frame ground 24 through ground conductor 16d to the power center 15. Current transformer 35 picks off the monitor signal from the ground wire 16d prior to ground 25. Using the current transformer 35 and passing ground wire 16d through it, eliminates the need to open the ground wire 16d to physically interpose circuit components between the frame of mining machine 22 and ground point 25.

Figure 4:
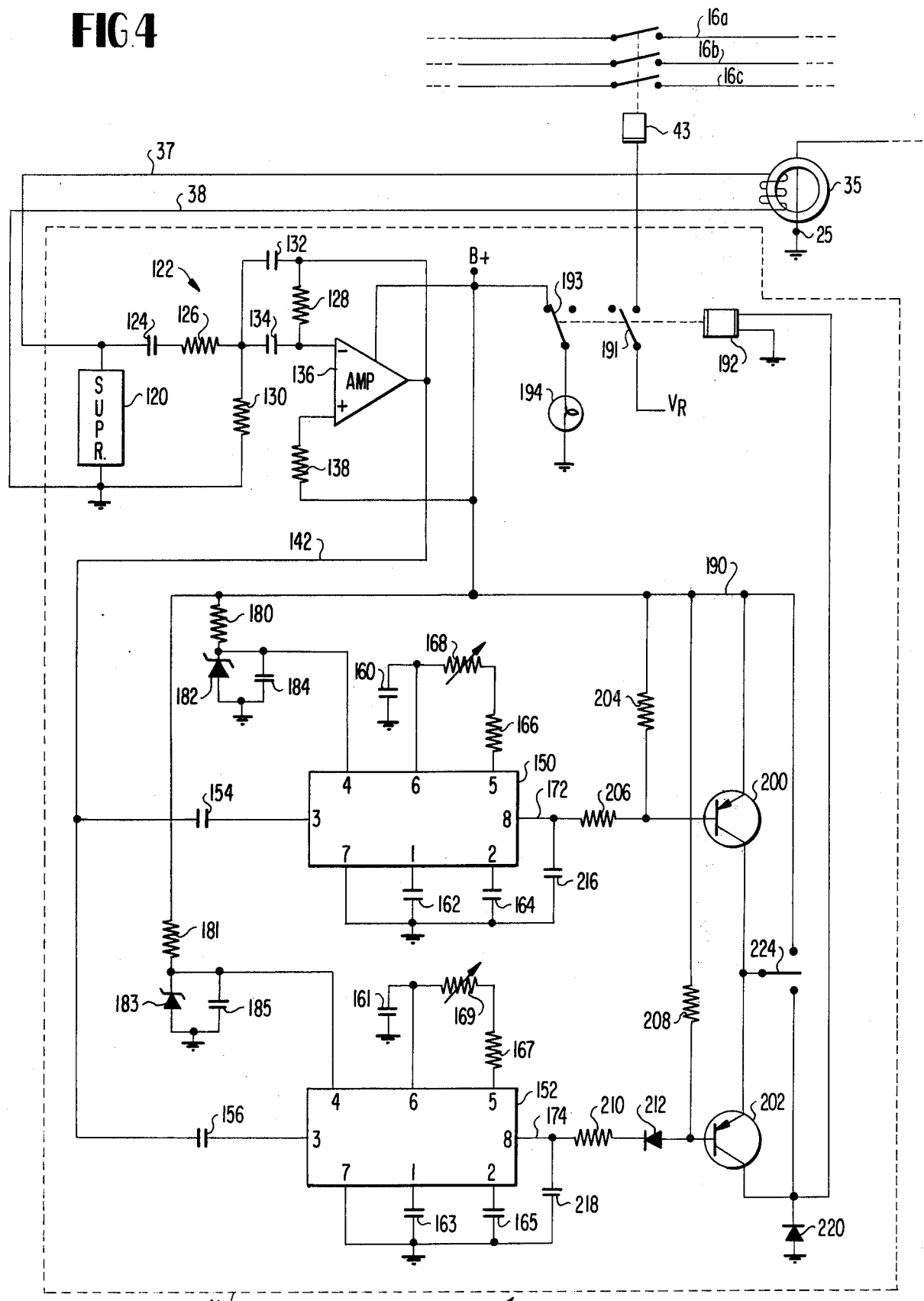
FIG. 4 is a circuit diagram of a receiver of the system of FIG. 1.

The monitor signal from current transformer 35 passes to receiver 41 over lines 37 and 38. Receiver 41, of FIG. 4, is sensitive to signals as low as about 50 millivolts from the current transformer 35. A surge suppressor 120, similar to the surge suppressor 77 previously discussed for the transmitter, protects the circuitry of receiver 41 from large voltage spikes which may be coupled from transformer 32.

The first stage 122 of receiver 41 is a combination active filter and amplifier. The monitor signal from lines 37, 38 passes through the coupling capacitor 124 to the filter network which includes resistors 126, 128, 130 and capacitors 132 and 134. Amplifier 136 forms part of the filter network, and can be an LM 3900 integrated circuit available from National Semiconductor Company. The values of the filter resistors and capacitors are chosen to provide a Q of approximately 6 with a center frequency at the monitor signal frequency of approximately 4.1 kilohertz. Resistor 138 provides bias for amplifier 136. The first stage 122 of receiver 41 passes and amplifies the 4.1 kilohertz monitor signal and rejects other noise frequencies. The filtered and amplified signal on amplifier line 142 passes to the parallel phase locked loop frequency discriminators 150 and 152 through the couling capacitors 154 and 156 respectively.

Each phase locked loop frequency discriminator is contained within an integrated circuit such as an LM 567 CN available from National Semiconductor Company. When the discriminators 150 and 152 are connected as shown in FIG. 4 with capacitors 160 and 161, 162 and 163, and 164 and 165, with resistors 166 and 167, and with variable resistors 168 and 169, each will track the signal frequency even if there is variation of up to about ± five percent from the center frequency of 4.1 kilohertz. The phase locked loop frequency discriminators 150 and 152 provide low level output on line 172 and 174 respectively as long as the discriminators are locked into a signal of sufficient amplitude and of proper frequency that is within the capture range of frequencies of the phase locked loops. When the incoming signal frequency deviates beyond the tracking range of either discriminators 150 and 152, or when the signal level drops below the value detectable by the discriminators, indicating a fault is present in the cable or elsewhere in the monitor system, a high output is produced by each discriminator on the respective lines 172 and 174.

D-C voltage supplied to the discriminators 150 and 152 is regulated by the two networks which include resistors 180 and 181, Zener diodes 182 and 183, and capacitors 184 and 185 to provide immunity to varying supply voltage conditions.

The receiver 41 also includes a transistor output stage 190 which drives a relay having contacts 191 and 193 and a coil 192. Normally open contact 191 provides a continuous current path from relay voltage supply $V_R$ to maintain power breaker 43 conducting so long as the coil 192 is energized. Coil 192, when energized maintains contact 193 open so alarm device 194 is not energized. When a fault condition exists, coil 192 is de-energized, contact 191 opens so current from supply $V_R$ to the main power breaker 43 is interrupted and A-C power is disconnected from conductors 16a, 16b and 16c, and alarm contact 193 closes to energize alarm 194.

Receiver output stage 190 includes two PNP transistors 200 and 202. The base of transistor 200 is held at a voltage between the B+ supply voltage and the voltage presented on line 172 by the voltage divider including resistors 204 and 206. A similar voltage divider including resistors 208 and 210 is provided for the base of transistor 202, but with diode 212 between the resistors so that if the base of collection 202 might short, it would not be possible for the circuit to fail with the relay held closed.

In operation, when a monitor signal of proper amplitude and frequency is received at receiver 41, phase locked loop discriminators 150 and 152 lock into the signal and outputs on lines 172 and 174 are at a low level. As a result, the voltages at the base of transistors 200 and 202 cause the transistors to conduct and energize relay coil 192. Contacts 191 then provide a current path from supply $V_R$ to main breaker switch 43 to maintain the switch 43 closed, connecting the conductors 16a, 16b and 16c to the A-C power source.

In the event of a serious fault in the ground or conductor system, the signal at the receiver drops below a predetermined magnitude. Discriminators 150 and 152 can no longer track the signal and the outputs 172 and 174 go to their high state. The voltages at the bases of transistors 200 and 202 increase and cause the transistors to cut-off. Current to the relay coil 192 is cut-off, and the main breaker switch 43 opens removing A-C power from the conductors 16a, 16b and 16c. Relay coil 192 also closes alarm contact 193 which operates fault alarm 194.

To prevent nuisance tripping of the main breaker switch 43 due to brief intermittents, a time delay of about 250 milliseconds is built into the system using capacitors 216 and 218. The time necessary to turn off transistors 200 and 202 when a fault occurs is determined by the time required to charge either capacitors 216 or 218 from the low state to a higher level which causes either transistors to become non-conducting. Diode 220 prevents negative voltage spikes which could damage the transistors when coil 192 is de-energized.

As is evident from the circuit of FIG. 4, current will cease to flow from the output stage 190 to relay coil 192 after the delay period of approximately 250 milliseconds when either output 172 or 174 passes to its high state. Therefore, should either discriminator 150 or 152 fail to operate properly, the remaining discriminator will still operate to cause coil 192 to become de-energized upon occurrence of a fault in the machine cable or ground. The parallel discriminators 150 and 152 thus guard against failure of each other and prevent the closing of main breaker swith 43 even if one of the discriminators malfunctions so its output is locked in the low state. Momentary contact switch 224 may be used to by-pass either transistor 200 or 202 to test the operation of each parallel discriminator. Unless a monitor signal of proper frequency and amplitude is received at the receiver 41, momentarily by-passing either transistor with switch 224 will not energize relay coil 192 unless one of the discriminators is faulty and locked at a low output level.

Resistor 88, shown in FIG. 2 at the output of the monitor signal transmitter 28, provides a high impedance path for the monitor signal when normally closed test switch 86 is opened. By opening switch 86, the amplitude of the monitor signal is reduced to a level below that which discriminators 150 and 152 at receiver 41 can track, and consequently the relay switch 192 and the main breaker switch 43 should open. Failure of the main breaker switch 43 to open when test switch 86 is opened and switch 224 is moved to either closed position indicates one of the parallel phase locked loop discriminators or its associated output circuit in output stage 190 is faulty. Test switch 86 may also be used to check monitor system sensitivity. Failure of main breaker switch 43 to open when the receiver 41 is properly operating and when switch 86 is opened, is an indication that the output level of the transmitter amplifier 60 is too high and that level adjustment using variable resistors 63 is necessary. Complete testing and adjustment of the monitor system is from a single location directly at the power center 15.

Figure 5:
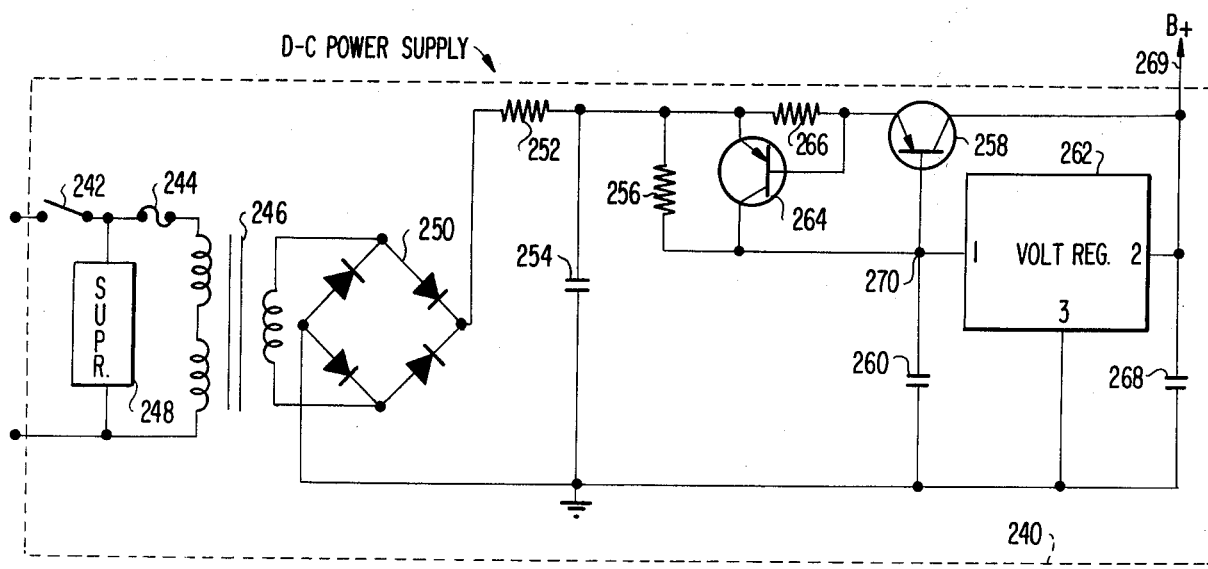
FIG. 5 is a circuit diagram of the D-C power supply for the receiver and transmitter of the monitor system.

D-C power supply 240, shown at FIG. 5, includes a line switch 242 for connecting an A-C power line through fuse 244 to the primary of transformer 246. A surge suppressor 248 protects the main power supply from voltage spikes and transients. Rectifier bridge 250 supplies direct current through a current limiting resistor 252 to a filter capacitor 254. Regulated D-C supply voltage (B+) is provided using the network including resistor 256, transistor 258, capacitor 260 and integrated circuit voltage regulator 262 connected as shown. Regulator 262 can be an LM 340K-12 manufactured by National Semiconductor Company.

During normal operation of power supply 240 when the output load draws current somewhat less than the maximum output of the power supply, some of the current supplied to output 269 is along the leg including resistor 266 and transistor 258, and some of the current is from voltage regulator 262 through resistor 256. At operation near the maximum current output of the power supply, the ratio of the current from transistor 256 to the current from voltage regulator 262 is on the order of 12 to 1. When the output current drawn by the load is very low, this ratio can decrease.

During very light loads, the current through resistor 266 is near zero, and the voltage at the base of transistor 264 is sufficiently high that transistor 264 is non-conducting. In addition, the voltage drop across resistor 256 is quite low so that the voltage at junction 270 and the base of transistor 264 is sufficiently high that transistor 258 is essentially non-conducting. As the load on the power supply increases, voltage regulator 262 draws current through resistor 256. The resulting voltage drop at junction 270 causes transistor 258 to become conducting so it supplies some of the current at output 269. At maximum rated current output of the power supply, transistor 264 is still non-conducting, and transistor 258 provides approximately 12 times the current provided by voltage regulator 262.

In the event of overload, the voltage drop across resistor 266 becomes sufficient to render transistor 264 conducting, thereby increasing the voltage at junction 270 to render transistor 258 non-conducting. The voltage regulator 262 has built-in overload protection so it becomes non-conducting in the event of an overload. This maintains the current through resistor 256 low so that the voltage at junction 270 is sufficiently high to also keep transistor 258 non-conducting.

Regulation of the output voltage by power supply 240 is excellent despite variations of A-C supply line voltage. This power supply has the capability of producing a constant D-C voltage even if the supply line voltage drops to 60 percent of its normal voltage.

OPERATION

The start-up and operation of the continuity monitoring system will now be described. With the various portions of the continuity monitoring system connected to the mining machines and cables, as shown at FIG. 1, the initial step is start-up and testing. The receivers for all the mining machines, the transmitter 28, and the power supply 240 are at the same location at power center 15, and the transmitter and all receivers are powered from the single power supply 240. Closing switch 242 (FIG. 5) of the power supply energizes all the receivers and energizes transmitter 28, but the transmitter does not becomes operative until its switch 80 is closed. During start-up, switch 80 is intentionally left open so no monitor signal is generated by transmitter 28. Under these conditions, with no monitor signal transmitted, the relay 192 of each receiver should be un-energized and correspondingly, the warning lamp 192 of each properly operating receiver will be illuminated.

If the operator finds lamps 194 of all the receivers illuminated, the next step is to close switch 80 of transmitter 28 to generate and transmit the monitor signal. As previously explained, the single transmitter 28 provides the monitor signal for the power cables of all the mining machines. This monitor signal is coupled to the power conductors of the trailing cable of each mining machine, for example, to the conductors 16a, 16b and 16c of cable 16 of FIG. 1, by the three phase filters such as filter 30. The monitor signal travels along the power conductors to the mining machine 22 where it is decoupled by filter 33, is connected to frame ground 24, and returns to ground 25 along the ground conductor 16d, where it is picked off by transformer 25 and is coupled to receiver 41. If the trailing cable is intact, and all the ground connections are electrically good, a monitor signal with proper amplitude and frequency will be processed by the receiver 41, transistors 200 and 202 (FIG. 4) of the receiver will be rendered conducting, and relay coil 192 will be energized to close contact 191, thus energizing the circuit breaker 43 and connecting the three phase power supply to the mining machine 22 which the receiver 41 monitors. If the warning lamp 194 of the receiver 41 remains illuminated, the operator can immediately tell that the receiver is defective. All the other receivers are of course checked at the same time.

Next, normally closed test switch 86 (FIG. 2) of transmitter 28 is opened. This causes the transmitted monitor signal to pass through and be attenuated by resistor 88. If the system is properly adjusted, the signal received by each receiver via the conductors and ground wire will be of insufficient amplitude to be tracked by the receiver discriminators, and correspondingly, the relay coil 192 (FIG. 4) of each receiver will become un-energized and power will be disconnected from each cable. The warning lamp of each receiver should then be illuminated. If this warning lamp is off on any receiver, the receiver is defective. Assuming that all the warning lamps of the receivers are illuminated, switch 224 (FIG. 4) of each receiver is moved to both its closed positions while warning lamp 194 is observed. As described previously, switch 224 is selectively operable to shunt either transistor 200 or transistor 202 of a receiver. Should the warning lamp extinguish when the switch is operated to either position, it is known that a portion of the receiver is defective.

Where no false indications are received, it is known that the entire system including all the receivers and the transmitter are operative, and that the trailing cables for each machine are intact.

In the event that depressing test switch 86 does not de-energize the relay coils 192 of the receivers, this is an indication that the output level of the monitor signal from the transmitter is too high. The level of the signal can be lowered by adjusting resistor 63.

In the event that any power conductor of any cable such as power conductors 16a, 16b or 16c of cable 16 becomes severed, or broken, the monitor signal level coupled to the frame ground of the associated machine, and which is returned to the associated receiver through the ground conductor, will be of a decreased level insufficient to be tracked by the discriminators of the receiver. Correspondingly, the relay coil 192 of the associated receiver becomes un-energized and the circuit breaker opens disconnecting the power cable for the machine from the three phase power supply. Power is similarly disconnected from the machine in the event that the ground conductor for the machine is broken or the ground connection at either the frame ground on the machine or actual ground becomes defective.

Although this system is intended primarily for use with a pilotless cable, the system is readily adaptable for use with a cable system which already includes an additional pilot wire. The pilot wire may be connected to pilot tap 290 of transmitter 28 shown in FIG. 2. The monitor signal is coupled directly from tap 290 to the pilot wire. At the mining machine the pilot wire is connected directly to the frame ground of the machine. Operation for the pilot wire system is identical to that of the pilotless system except that the three phase filters are not used. As with the pilotless system, only one transmitter 28 is necessary to supply the monitor signal to monitor the cables of a multiplicity of mining machines.

What is claimed is:

1. A continuity monitoring system for a machine having a power cable for supplying electrical voltage and current to the machine from a power supply, the cable having power conductors and a ground conductor which is grounded to the machine, said system comprising; transmitter means for generating a monitor signal having a predetermined amplitude and a predetermined frequency different from the frequency of said current supplied by said power supply, first coupling means located between the power supply and the machine for coupling the monitor signal to a conductor of the cable, second coupling means at the machine for receiving the monitor signal from the conductor and for coupling the signal to a ground on the machine so that the signal is conducted to and transmitted along the ground conductor, receiver means, third coupling means remote from the machine for coupling the monitor signal from the ground conductor to said receiver means, said receiver means comprising a discriminator means comprised of a pair of phase locked loop means connected in parallel, each of said phase locked loop means having the same amplitude and frequency characteristic and each being responsive to said received monitor signal for producing a predetermined output only when said received monitor signal is above a predetermined level and within a predetermined frequency range, power switch means having two states and being connected between said power supply and said cable for supplying power from said supply to said cable when in a first state and for interrupting said power when in a second state, and circuit means connected between said phase locked loop means and said power switch means for causing said power switch means to switch to said second state to interrupt the power to said cable in response to the absence of said predetermined output from either one of said phase locked loop means, so that said switch means interrupts the power to the cable when the improper monitor signal is received even if one said phase locked loop means is defective, said circuit means comprising two switch means connected in series, a different one of said phase locked loop means being connected to each of said switch means, each of said switch means comprising means for becoming electrically an open circuit responsive to the absence of said predetermined output from the phase locked loop means to which it is connected, and said series combination of switch means being connected between a source of voltage and said power switch means so that current supply to said power switch means is interrupted when said predetermined output is absent from either one or both of said phase locked loop means.

2. The system of claim 1 wherein said transmitter means comprises a single transmitter, and the system comprises a multiplicity of said above-mentioned systems, but only a single transmitter for supplying the monitor signal for all the system and wherein said single transmitter comprises output drive means for providing a substantially uniform monitor signal output for said multiplicity of above-mentioned systems despite variations in the number of such systems.

* * * * *